Patented July 21, 1925.

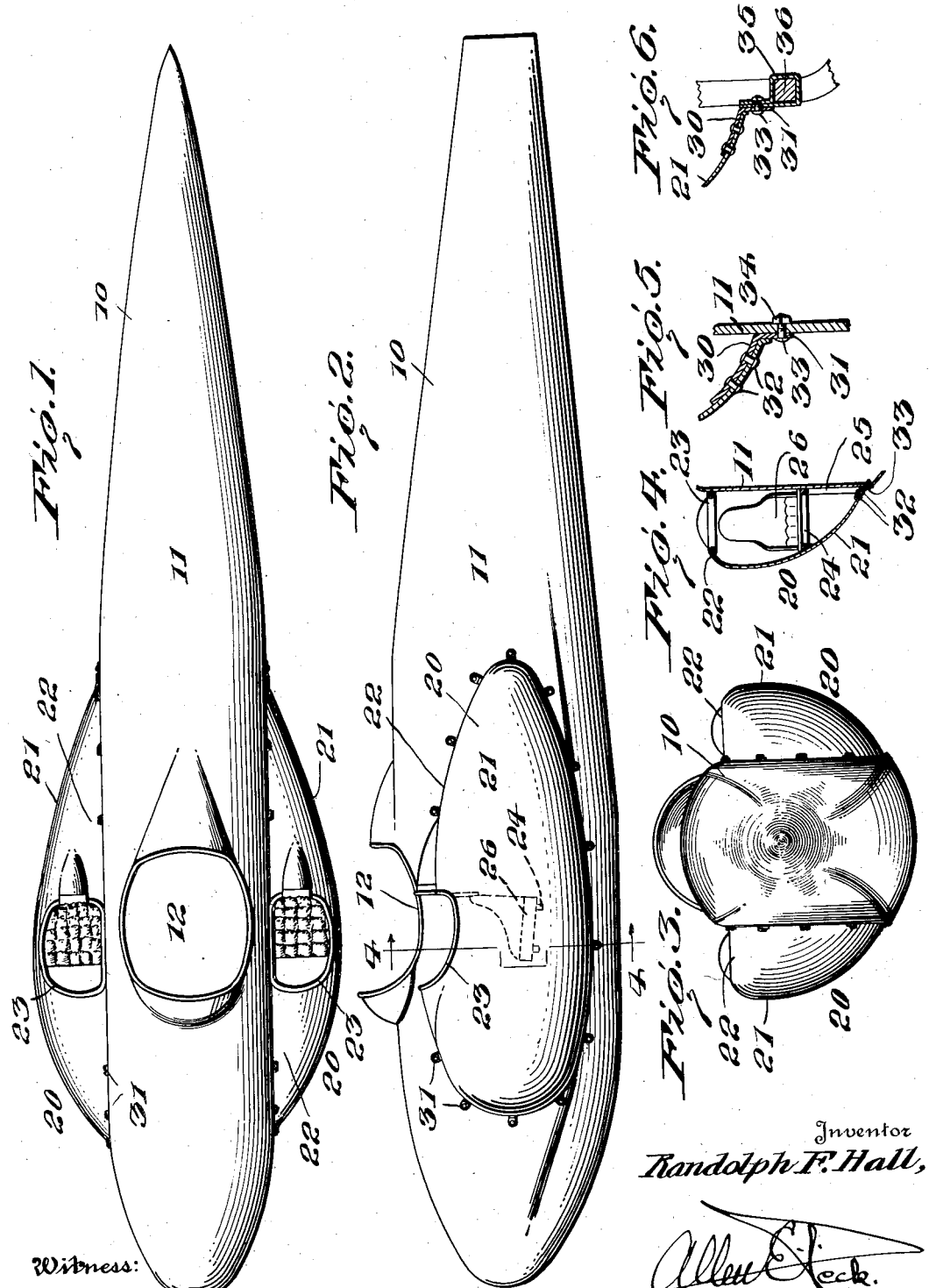

1,547,119

UNITED STATES PATENT OFFICE.

RANDOLPH F. HALL, OF ITHACA, NEW YORK, ASSIGNOR OF ONE-THIRD TO THEODORE P. HALL, OF WALLINGFORD, CONNECTICUT.

AIRCRAFT SIDE CAR.

Application filed April 10, 1922. Serial No. 551,155.

*To all whom it may concern:*

Be it known that I, RANDOLPH F. HALL, a citizen of the United States of America, a resident of Ithaca, county of Tompkins, State of New York, have invented certain new and useful Improvements in Aircraft Side Cars, of which the following is a specification.

This invention relates to aircraft side cars; and the nature and objects of the invention will be readily understood by those skilled in the art in the light of the following explanation and detailed description of the accompanying drawings illustrating what I now believe to be the preferred embodiments or mechanical expressions of the invention from among various other forms, arrangements, combinations and constructions of which it is capable within the spirit and scope thereof.

The invention is directed to the provision of auxiliary cars or compartments adapted to be detachably mounted on and to the bodies of aircraft to increase, or to more suitably locate and dispose the passenger or cargo space, as required to meet the needs and exigencies encountered under the conditions of service in the operation of such craft. Although the invention is adapted and applicable to all types of aircraft, both lighter-than-air and heavier-than-air, it is particularly adapted for and attains its maximum utility and efficiency in use on and in connection with aircraft of the airplane types.

According to the present invention, cars or compartments are provided for mounting on the exterior of the bodies, fuselages or nacelles, of airplanes. Among the primary and essential factors considered in the design and construction of airplane bodies, are head or parasite resistance and a minimum weight possible consistent with required strength to maintain a sufficiently high factor of safety. Head or parasite resistance in an airplane body is reduced to the minimum possible for the particular design and type of airplane in which it is incorporated, by forming and constructing the body of stream line form and eliminating as far as possible all exterior protruding or projecting elements tending to interrupt the streamlining of the body and present exposed resistance creating surfaces. The weight of an airplane body is reduced to the minimum possible consistent with strength, by constructing the body of elements formed of light, strong materials, and by so arranging and assembling such elements that the minimum number and weight thereof are required to completely absorb and care for all the possible strains and stresses to which the body may be subjected in operation and use. Hence, it follows, as is well known and understood by those familiar with this art, that in any type and design of airplane the parasite or head resistance and the weight of the body thereof, among other factors, have an important fundamental bearing on the resulting aerodynamic efficiency of such airplane, and that in direct proportion to an increase in the head or parasite resistance of the body thereof, the resulting aerodynamic efficiency of the airplane is lowered. Further, an increase in the weight of the body tends to lower the efficiency of the airplane and decreases the useful load of which the airplane is capable.

Therefore, one of the main objects of the present invention is the provision of cars or compartments adapted to be mounted on and attached to airplane bodies with a resulting minimum decrease in the aerodynamic efficiency of the airplanes in which said bodies are incorporated, by so forming and mounting such cars or compartments as to secure a minimum increase in the head or parasite resistance of the airplane bodies on which they are mounted, and a minimum increase in weight with the resulting minimum decrease in useful load of which the airplanes provided with such cars or compartments are capable.

A further object of the invention is the provision of auxiliary cars or compartments which are capable of detachable mounting on and to airplane bodies without decreasing or lowering the strength and factor of safety of the airplane bodies to which they are attached, and which in mounted attached position will provide structures of the required strength and rigidity having the necessary high factor of safety in operation and use on airplanes.

A further object of the invention is to provide cars or compartments which are capable of being detachably mounted on airplane bodies and extending on the exterior thereof, and which cars or compartments are so formed and constructed that in mounted position the shape or contour thereof merges with and forms a substantial continuation of the stream line form of the body to which they are attached, so that sharp, abrupt angles between the cars and bodies on which they are mounted are eliminated and the increase of head or parasite resistance of the body to which such cars are mounted is proportionately low.

A further object of the invention is the provision of detachable cars or compartments adapted to be mounted on airplane bodies, which are so formed and constructed that they may be attached to and mounted on a body without requiring material or major reconstruction or reorganization of the body structure, thus permitting practical use of such cars on existing types and constructions of airplane bodies.

A further object of the invention is to provide a simple, light weight and efficient auxiliary car or compartment for detachable mounting on and to the side of an airplane body so that the passenger or cargo space of the body can be increased or the disposition thereof arranged, as the exigencies of service require, without materially affecting the efficiency, balance or strength of the airplane on the body of which such car is mounted; and further to so form and construct such a car that a plurality thereof may be mounted and disposed on an airplane body as desired.

With the foregoing and various other objects in view, which other objects will be readily recognized and appreciated by those skilled in the arts involved, the invention consists in certain novel features in constructions, arrangements and combinations, as more fully and particularly specified and pointed out hereinafter.

Referring to the accompanying drawings:

Fig. 1 is a top plan view, more or less diagrammatical, of an airplane fuselage or nacelle, with cars or compartments embodying the features of the invention mounted thereon and attached thereto.

Fig. 2 is a side elevation of the embodiment and mounting of the invention disclosed in Fig. 1.

Fig. 3 is a front elevation of the disclosures of Figs. 1 and 2.

Fig. 4 is a vertical transverse section through one of the cars or compartments of the invention, taken on the line 4—4, Fig. 2, and showing a portion of the fuselage or nacelle to which it is attached.

Fig. 5 is a detail section showing one manner of detachably mounting the embodiment of the cars of the invention disclosed in Figs. 1, 2 and 3, to the fuselage or nacelle.

Fig. 6 is a detail section disclosing another manner and arrangement of attaching and securing the cars of the invention to an airplane body.

In the accompanying drawings an airplane body is more or less diagrammatically illustrated to typify generally all types of aircraft bodies, and it is to be understood that the body disclosed is purely by way of an example, as the invention is not limited to mounting on and use in connection with any particular form, arrangement or construction of aircraft body, but is applicable generally to any and all bodies. The invention contemplates and provides auxiliary cars or compartments for mounting on aircraft bodies, and in order to clearly bring out the nature, objects and results of the invention one form and adaptation of which it is capable is illustrated in the drawings, and described and explained hereinafter, as mounted on and in connection with the disclosed example of an aircraft body.

An airplane fuselage 10 having the usual cockpit 12, all of more or less conventional type, is illustrated in the drawings. The fuselage 10 is of streamline form and includes the usual or any other suitable outer covering or skin 11 which is secured thereover and provides a fuselage with an exterior shape and contour which offers a minimum head or parasite resistance in flight all of which is well understood by those familiar with this art. In the illustrated form, the fuselage 10 has its greatest depth and width forward of the longitudinal center and is gradually reduced in depth and width forwardly and rearwardly to the nose and tail thereof, respectively, following the well established principles for streamlining aircraft bodies. The invention provides cars or compartments which are adapted to be detachably mounted on the sides of an aircraft body, such as the airplane fuselage 10, with a minimum increase in the head or parasite resistance and a minimum increase in the weight of the body on which such a car or cars are mounted.

In the illustrated example, the cars 20 embodying the invention are detachably mounted on opposite sides, respectively, of the fuselage 10, attached to the permanent fuselage structure and extend laterally and outwardly from opposite sides thereof. Each car or compartment 20 consists of a hollow shell like body having the inner sides thereof adjacent the fuselage 10 open and conforming to the contour of the fuselage side, so that each car 20 fits against and is closed at the inner open side thereof by the adjacent side of the fuselage. The forward and rear portions of the body forming wall or shell 21 of each car 20 are gradually curved inwardly toward and meet the side of the fuselage respectively, adjacent thereto, and the degree of this curvature of the car wall 21 fore and aft is such that the point of greatest width is forward of the longitudinal center and the wall 21 gradually merges forwardly and rearwardly into and forms a substantial outward continuation of the fuselage side to which the respective car 20 is mounted, as will be clearly apparent by reference to Fig. 1 of the drawings. The wall 21 of each car is curved downwardly and inwardly toward and meets the adjacent fuselage side to which the car is mounted, and merges into and substantially forms an outward and upward continuation of the curvature and contour of the lower or under side of the streamline fuselage 10. The wall 21 of each car 20 extends upwardly and terminates in a substantially horizontally disposed wall 22 which extends inwardly to the adjacent fuselage side and across and forming a top covering or closing wall for the cars. The cars 20, so formed, are tapered fore and aft, that is, are gradually decreased in depth forwardly and rearwardly to substantially follow the longitudinal taper of the upper and lower sides of the fuselage 10, thus completing the streamlining of the cars 20, so that the cars substantially conform to the streamlining of the fuselage 10 on which they are mounted. In this manner, the mounting of the cars 20 to the fuselage 10 is possible with the minimum increase in head or parasite resistance, as the cars are not only streamlined themselves but are formed with a curvature and contour substantially conforming to and in continuation of the stream lining of the fuselage 10, so that, the cars 20 in effect merge into the fuselage and avoid all abrupt angles forming resistance creating surface, or angles and curves not in harmony with the contour of the fuselage 10 on which they are mounted.

In the particular embodiments of the invention illustrated, the cars 20 are preferably formed of any suitable or desired sheet material, stamped, pressed or molded into the peculiar dished or convex-concave form to provide the hollow shell-like body as hereinbefore described, with the required contour and curvature to conform as closely as practical with the contour of the particular aircraft body on which they are to be mounted and with which they are to be used. The cars 20, in the present instance, are each formed with the opening 23 through the upper cover or closing wall 22, to provide a suitable cockpit therein. Horizontally disposed seat bearers 24 are mounted in the cars 20 and are supported at the inner sides of the cars by the uprights 25, and at the outer sides by the walls 21 of the cars. Suitable seats 26 are mounted on and supported by the bearers 24 and uprights 25 and are accessible through the openings 23 in the upper walls of the cars. The foregoing arrangement is clearly shown in Figs. 1, 2 and 3 of the accompanying drawings.

The invention includes the detachable mounting of the side cars to the aircraft body, and one manner and arrangement of carrying out this feature of the invention in connection with the illustrated embodiment of side cars of the invention is disclosed and described herewith. A series of attaching straps or lugs 30 are secured at spaced intervals around the inner open side portions of the cars and extend outwardly a distance therefrom to provide the ears 31 which are adapted to bear and fit against the side of an aircraft body with the cars in mounted position thereon. The lugs 30 may be secured to the cars in any desired manner, as by rivets 32, or by welding, and any desired number may be utilized to obtain the required rigid strong mounting of the cars to an aircraft body. In the present instance, the ears 31 are formed with bolt holes in which are mounted the attaching bolts 33, and the cars 20 are mounted on the sides of the fuselage 10 by extending the bolts 33 through the skin 11, which in the present instance, is preferably formed of metal sheet, or any other permanent elements of the fuselage structure, and then securing the cars in place by the nuts 34 on the ends of the bolts which are extended into the fuselage. In this manner, the cars 20 are tightly and rigidly clamped and maintained in mounted position on the sides of the fuselage. In order to detach and dismount the cars 20, the nuts 34 are removed from the bolts 33 and the cars are withdrawn and removed from the sides of the fuselage. By the foregoing manner of detachably mounting the side cars to the fuselage, the side car loads are transmitted and distributed directly to and absorbed by the permanent fuselage structure, with the result that a high factor of safety is secured for the cars in mounted position and a reorganization of, or additions to the fuselage structure are avoided. It will be noted that due to the form and arrangement of the side cars 20 the weight thereof may be maintained extremely low with a correspondingly small increase in the weight of an aircraft body on which they are mounted.

Another form of attaching means is illustrated in Fig. 6 of the drawings, in which a fitting 35 is formed to be secured around a portion of the fuselage structure, such as a longeron 36 of a fuselage frame, and provide a plate portion 37 to which the attaching lug 30 of a car can be secured by the bolt 33 thereof. By suitably positioning a series of the fittings 35 to elements of a body structure to receive the attaching lugs 30, a car 20 can be rigidly secured and detachably mounted in desired position on the body.

The side cars 20 may be formed in any suitable manner of any desired material and various arrangements and constructions of attaching means may be utilized without stepping beyond the limits of the invention, although it is preferable that the attaching means employed be of a type which are secured to the permanent body structure and which avoid exposed projecting or protruding portions which form resistance creating surfaces. Although in the illustrated example of the invention, the cars are provided with seats for passengers, it is to be understood that the cars or compartments may be utilized for cargo or for oil and fuel tanks, or in fact may be put to any desired use. Two cars mounted on opposite sides of a body are shown purely by way of example, as any desired number or arrangement of cars possible on a body to which it is desired to mount the same may be utilized. However, the illustrated mounting of cars
20 on opposite sides of a body is preferable for reasons of balance, and distribution of head resistance and car loads.

The invention is not limited to the peculiar shape and contour of the illustrated and described cars, as it is clear that the shape and contour of the cars will vary to meet the requirements of the particular bodies on which they are to be mounted. If desired a standardized shape and contour may be designed for use on general types of aircraft to permit interchanging of the cars.

Attention is also directed to the fact that, although in the preferred form of the invention illustrated herewith the cars are formed with open inner sides, it is to be understood, of course, that the invention contemplates and includes the use of a closed inner side formed by any suitable or desired wall or bulkhead conforming to the contour of the body against which a car is to be mounted. It is apparent that particular conditions may require the use of an inner strengthening wall for a car; an inner wall to perform a function in retaining cargo; or it may be found desirable to provide a car with an inner wall forming a fireproof bulkhead between a body and the interior of a car.

By the use and employment of the invention on aircraft and particularly with airplanes, the scope and usefulness of such craft is considerably increased as the varying demands thereon can be met within certain limits by mounting a car or cars of the invention thereon, for example, to increase the passenger or cargo space of a plane to accommodate an increased load which may not be sufficient to warrant the use of a larger craft, but which is greater than the plane as constructed can care for, or where it is desired to increase the fuel capacity of a plane, the cars of the invention can be utilized to transport the required quantities of fuel. The foregoing being practically possible due to the small increase in head resistance and weight by the addition of the cars of the invention and the feature of the invention which makes possible the detachable mounting of the cars without weakening a body structure and with a sufficiently high factor of safety in the cars in mounted position.

It is evident that various changes, modifications and variations might be resorted to without departing from the spirit and scope of my invention, and hence I do not wish to limit myself to the exact disclosures hereof.

Desiring to protect my invention in the broadest manner legally possible, what I claim is:

1. A side car for aircraft bodies, comprising a stream line shell-like body having an open inner side adapted to fit against, conform to and be closed by the side of an aircraft body in mounted position thereon.

2. An auxiliary car or compartment for detachable mounting on and against the side of an aircraft body, comprising a streamline shell-like body having an open inner side adapted to fit against, conform to and be closed by the side of an aircraft body in mounted position thereon, and means for detachably securing said car in mounted position, the said means positioned within said car and extending through the open inner side thereof for detachable securing to the permanent structure of the body, the said means substantially enclosed by said car in mounted position.

3. An auxiliary car or compartment for detachable mounting on the side of an aircraft body, comprising a shell-like body having a cockpit formed therein and opening through the upper side thereof, a seat mounted in said cockpit below the opening through the body, and means for detachably mounting said auxiliary car to an aircraft body.

4. An auxiliary car or compartment for detachable mounting on the side of an aircraft body, comprising a substantially streamline body having a cockpit formed therein opening through the upper side thereof, and means for detachably mounting said body on and extending laterally from the side of an aircraft body.

5. An auxiliary car or compartment for detachable mounting on the side of an aircraft body, comprising a substantially streamline shell-like body having a cockpit formed therein, the said auxiliary car so formed adapted to be mounted in rigid fixed position against and extending laterally from the side of an aircraft body, and means for detachably securing said auxiliary car in mounted position on an aircraft body and for transmitting the stresses therefrom to the load carrying structure of the aircraft body.

RANDOLPH F. HALL.